Patented June 7, 1938

2,119,882

UNITED STATES PATENT OFFICE 2,119,882

AMINOTRIFLUOROMETHYL-ARYL-SULPHONIC ACIDS AND PROCESS OF PREPARING THEM

Herbert Kracker and Fritz Herrlein, Frankfort-on-the-Main-Hochst, Germany, assignors to General Aniline Works, Inc., New York, N. Y., a corporation of Delaware No Drawing. Application September 27, 1935, Serial No. 42,512. In Germany October 3, 1934

7 Claims. (Cl. 260—129)

This invention relates to aminotrifluoromethyl-aryl-sulphonic acids and to a process of preparing them; more particularly it relates to compounds corresponding with the following general formula

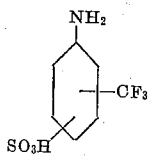

wherein the benzene nucleus may be further substituted by halogen, alkoxy, phenoxy, benzyloxy, nitro, trifluoromethyl, alkylsulphonyl, phenylsulphonyl or benzylsulphonyl groups.

Sulphonic acids of aminotrifluoromethyl-aryls have not yet been described in literature. Attempts to make these unknown sulphonic acids by sulphonating aminotrifluoromethyl-aryls, for instance, by means of concentrated sulphuric acid, sulphuric acid monohydrate or fuming sulphuric acid, at ordinary or raised temperature, show that sulphonation does not occur. The trifluoromethyl group is saponified to form the carboxylic acid group or the amine remains completely unchanged, and only the sulphate of the base is formed. The first reaction occurs when sulphuric acid or sulphuric acid monohydrate is used at raised temperature. By treating, for intance, meta-aminobenzotrifluoride at 100° C. or a higher temperature with sulphuric acid of 97 per cent. strength or sulphuric acid monohydrate, then pouring on ice and working up the mixture, there is obtained meta-amino-benzoic acid. At a lower temperature or by using fuming sulphuric acid of 10–70 per cent. strength at any temperature and working up by pouring the mixture on ice, there is obtained the sulphate of the base. By conducting the reaction with molecular proportions of sulphuric acid, sulphuric acid monohydrate or fuming sulphuric acid in an organic solvent, for instance, in ortho-dichlorobenzene at 170°–180° C., there is obtained in most cases the sulphate of the base in question.

This invention relates to a process in which chlorosulphonic acid is used as a sulphonating agent, whereby the formation of the sulphonic acids desired occurs in a smooth course. The reaction with chlorosulphonic acid may be performed, for instance, by introducing the base to be sulphonated into an excess of chlorosulphonic acid and by carrying out the sulphonation at ordinary or raised temperature, or by causing molecular proportions of chlorosulphonic acid and the base to react in an inert organic solvent at a raised temperature.

This reaction is the more surprising since, generally, the action of chlorosulphonic acid on trifluoromethyl-compounds takes another course. By introducing, for instance, benzotrifluoride into an excess of chlorosulphonic acid and allowing the whole to stand for some time, an exchange between the trifluoromethyl group and the chlorosulphonic acid occurs in such a manner that benzotrichloride and fluorosulphonic acid are formed; by pouring the mixture into water, the benzotrichloride is saponified with formation of benzoic acid. Thus, it is not possible to obtain in this manner sulphonic acid derivatives of trifluoromethyl bodies. In view of this fact, it was expected that by the action of chlorosulphonic acid on amino-substituted trifluoromethyl compounds the trifluoromethyl group would be destroyed in a similar way. The new sulphonic acids may be used as intermediates for the manufacture of dyestuffs.

The following examples illustrate the invention.

1. 161 grams of 1-amino-3-trifluoro-methyl-benzene are dissolved in 1000 cc. of ortho-dichlorobenzene which has been carefully dried. While well stirring, 120 grams of freshly distilled chlorosulphonic acid are added by drops. The whole is then slowly heated to boiling at about 180 C. Rapid evolution of hydrochloric acid gas sets in. After about 4–5 hours the evolution of hydrochloric acid has ceased. The whole is allowed to cool, the body which is suspended in the ortho-dichlorobenzene is filtered by suction, washed with ether and dried. The dry powder is dissolved in 600 cc. of warm 2N-sodium carbonate solution and 1000 cc. of water, freed from any separated unsulphonated base by extraction with ether and rendered acid to Congo paper by means of hydrochloric acid. The 1-amino-3-trifluoromethylbenzene-4-sulphonic acid produced is thus precipitated in the form of very fine small white needles which are filtered by suction, washed with water and dried. The compound forms in the dry state a loose white powder.

It corresponds with the following formula:

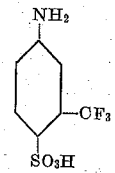

By working in a similar manner with 1-amino-4 - trifluoromethylbenzene, 1-amino-4-trifluoromethylbenzene-2-sulphonic acid is obtained. 1-amino - 2 - trifluoromethylbenzene - 4 - sulphonic acid is obtained in a similar manner from 1-amino-2-trifluoromethylbenzene. Both acids are likewise obtained in the form of a white powder.

2. 196 grams of 1-amino-2-chloro-5-trifluoromethylbenzene are dropped into 1000 grams of chlorosulphonic acid, while cooling with ice. A clear solution is obtained. The whole is stirred for 24 hours and the mixture is cautiously poured on ice. The separated body is filtered by suction, washed and dissolved in sodium carbonate solution and water as described in Example 1. By acidifying with hydrochloric acid, 1-amino-2-chloro- 5 -trifluoromethylbenzene- 4 -sulphonic acid is obtained in the form of fine small white needles. The same sulphonic acid is obtained by conducting the sulphonation, as described in Example 1, in chlorobenzene at 110° C.

In the same manner there are obtained 1-amino-2,4-dichloro-5-trifluoromethylbenzene-6-sulphonic acid from 1-amino-2,4-dichloro-5-trifluoro-methylbenzene, 1-amino-2,5-dichloro-3-trifluoromethylbenzene-4-sulphonic acid from 1-amino - 2,5 - dichloro- 3 -trifluoromethylbenzene, and 1-amino-2-bromo-5-trifluoromethylbenzene-4-sulphonic acid from 1-amino-2-bromo-5-trifluoromethylbenzene.

3. 196 grams of 1-amino-4-chloro-2-trifluoromethylbenzene are sulphonated in 1000 cc. of chlorobenzene as described in Example 1 at 110°–120° C. After about 2 hours the evolution of hydrochloric acid gas is finished. After working up as described in Example 1, 1-amino-4-chloro - 2-trifluoromethylbenzene - 6-sulphonic acid is obtained in the form of a white microcrystalline powder.

4. 196 grams of 1-amino-4-chloro-3-trifluoromethylbenzene are caused to react at about 160° C. with 120 grams of chlorosulphonic acid in 1000 cc. of a technical mixture consisting of ortho-dichlorobenzene and para-dichlorobenzene, in the manner described in Example 1. The sulphonation is finished after 2–3 hours. After working up as usual, 1-amino-4-chloro-3-trifluoromethylbenzene-6-sulphonic acid is obtained in the form of a white micro-crystalline powder.

5. 191 grams of finely powdered 1-amino-2-methoxy-5-trifluoromethylbenzene are introduced into 1000 grams of chlorosulphonic acid. The whole is stirred, until a clear solution is obtained and heated slowly to 120° C. After 4–5 hours the sulphonation is finished. The whole is poured on ice with precaution, the precipitate formed is filtered with suction and dissolved in warm sodium carbonate solution and water. Any base which might be present is extracted with ether. On acidification, 1-amino-2-methoxy-5-trifluoro-methylbenzene-4-sulphonic acid is obtained in the form of needles.

In a similar manner there are obtained 1-amino-4-methoxy-5-trifluoromethylbenzene-2 - sulphonic acid from 1-amino-4-methoxy-5-trifluoromethylbenzene, 1-amino-2 - ethoxy-5 - trifluoromethylbenzene-4-sulphonic acid from 1-amino-2-ethoxy-5-trifluoromethylbenzene, 1-amino-4-phenoxy-5-trifluoromethylbenzene - 2 - sulphonic acid from 1-amino-4-phenoxy-5-trifluoromethylbenzene, 1-amino-2-benzyloxy-5-trifluoromethylbenzene-4-sulphonic acid from 1-amino-2-benzyloxy-5-trifluoromethylbenzene, 1-amino-2.4-dimethoxy-5-trifluoromethylbenzene - 6 - sulphonic acid from 1-amino-2,4-dimethoxy-5-trifluoromethylbenzene.

6. 206 grams of 1-amino-2-nitro-4-trifluoromethylbenzene are disolved in 1000 cc. of nitrobenzene and 120 grams of chlorosulphonic acid are then run in. In the manner described in Example 1, the sulphonation is performed at 110° C. The sulphonic acid is filtered by suction, washed with ether and dried. The acid thus isolated is a yellow powder which in the form of the free acid as well as in that of the sodium salt is very easily soluble in water. By adding sodium chloride to the alkaline solution, the sodium salt of 1-amino-2-nitro-4-trifluoromethylbenzene-6-sulphonic acid is obtained in the form of yellow loose crystalline needles. By adding sodium chloride to the solution of the free sulphonic acid in water, the free sulphonic acid is obtained in the form of a loose yellow crystalline powder.

In a similar manner 1-amino-2-nitro-5-trifluoro-methylbenzene-4-sulphonic acid is obtained from 1-amino-2-nitro-5-trifluoromethylbenzene and 1-amino-4-nitro-5-trifluoromethylbenzene-2-sulphonic acid from 1-amino-4-nitro-5-trifluoromethylbenzene.

7. In the manner described in the foregoing examples, 230 grams of 1-amino-3,5-bis-trifluoromethylbenzene are sulphonated in 1000 cc. of tetrachlorethane with 120 grams of chlorosulphonic acid at 130° C. This acid, too, as well as its sodium salt, is very easily soluble in water and, when redissolved, they must be isolated by addition of a salt. 1-amino-3,5-bis-trifluoromethylbenzene-4-sulphonic acid is thus obtained in the form of fine white crystals; the sodium salt forms similar crystals.

In the same manner there are obtained 1-amino-2,5-bis-tri-fluoromethylbenzene-4 - sulphonic acid from 1-amino-2,5-bis-trifluoromethylbenzene and 1-amino-2-chloro-3,5-bis-trifluoromethylbenzene-4-sulphonic acid from 1-amino-2-chloro-3,5-bis-trifluoromethylbenzene.

8. 251 grams of 1-amino-5-trifluoromethylbenzene-2-ethylsulphone are dissolved in 1000 cc. of ortho-dichlorobenzene and 120 grams of freshly distilled chlorosulphonic acid are added by drops. The whole is then slowly heated to 120° C. and this temperture is maintained until the evolution of hydrochloric acid gas decreases. Thereupon, further 120 grams of chlorosulphonic acid are added, heating is continued at 120° C., until the evolution of hydrochloric acid decreases, thereupon a further 240 grams of chlorosulphonic acid are added. As soon as, after this last addition, hydrochloric acid gas is evolved only feebly at a temperature of 120° C., the whole is allowed to cool. The separated product is filtered with suction, washed with ether and dried. It is dissolved in 600 cc. of 2N-sodium carbonate solution, the free base which might be present is removed by extraction with ether, and the double quantity by volume of saturated sodium chloride solution is added to the clear aqueous solution. The sodium salt of 1-amino-5-trifluoromethylbenzene-2-ethylsulphone-4-sulphonic acid thus produced crystallizes in the form of white small needles which are separated from the mother liquor by filtering with suction and washed with saturated sodium chloride solution until neutral.

In a similar manner there are obtained 1-amino-3 - trifluoromethylbenzene - 4 - methylsulphone-6-sulphonic acid from 1-amino-3-trifluoromethylbenzene - 4 - methylsulphone, 1-amino-2-trifluoromethylbenzene - 4 - phenylsulphone -6- sulphonic acid from 1-amino-2-trifluoromethyl-benzene-4-phenylsulphone and 1-amino-5-trifluoromethylbenzene-2-benzylsulphone-4- sulphonic acid from 1-amino-5-trifluoromethylbenzene-2-benzylsulphone.

Besides the indifferent organic solvents mentioned in the foregoing examples there may be used other solvents, for instance other halogen-substitution products of the aromatic or aliphatic series, such as trichlorobenzene, chlorxylenes, halogenated ethanes or the like. By using any other amine of the trifluoromethyl series the sulphonation occurs in the same manner as in the foregoing examples.

We claim:

1. The process of preparing aminotrifluoromethyl-benzene-sulphonic acids which comprises causing a molecular excess of chlorosulphonic acid to act upon aminotrifluoromethyl-benzenes at temperatures up to about 180° C.

2. The process of preparing aminotrifluoromethyl-benzene-sulphonic acids which comprises causing chlorosulphonic acid and aminotrifluoromethyl-benzenes to react in an inert organic solvent at temperatures of about 110° C. to about 180° C.

3. The process of preparing aminotrifluoromethyl-benzene-sulphonic acids which comprises causing molecular proportions of chlorosulphonic acid and aminotrifluoromethyl-benzenes to react in an inert organic solvent at temperatures of about 110° C. to about 180° C.

4. The compounds of the following general formula

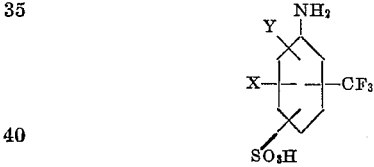

wherein X stands for a member of the group consisting of hydrogen, halogen, alkoxy, phenoxy, benzyloxy, nitro and trifluoromethyl and Y stands for a member of the group consisting of hydrogen, halogen and alkoxy, being crystallized compounds which are easily soluble in aqueous alkalies and insoluble in organic solvents.

5. The compound of the following formula:

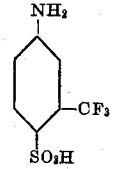

being easily soluble in aqueous alkalies and difficultly soluble in water from which it crystallizes in the form of fine small white needles.

6. The compound of the following formula:

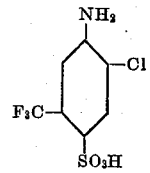

being easily soluble in aqueous alkalies and difficultly soluble in water from which it crystallizes in the form of fine small white needles.

7. The compound of the following formula:

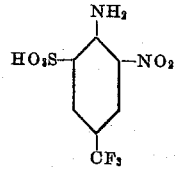

being a loose yellow crystalline powder which is easily soluble in water and aqueous alkalies.

HERBERT KRACKER.
FRITZ HERRLEIN.